United States Patent [19]

Furuta et al.

[11] Patent Number: 4,643,043
[45] Date of Patent: Feb. 17, 1987

[54] STICK TYPE VEHICLE HAND BRAKE LEVER MEANS

[75] Inventors: Yohichi Furuta; Takeo Yamasaki; Tomio Tachino; Masayoshi Tanikawa, all of Kariya, Japan

[73] Assignees: Aisin Seiki Kabushiki Kaisha; Toyota Jidosha Kubushiki Kaisha, both of Japan

[21] Appl. No.: 578,569

[22] Filed: Feb. 9, 1984

[30] Foreign Application Priority Data

Feb. 11, 1983 [JP] Japan .................................. 58-21863
Jun. 10, 1983 [JP] Japan ............................. 58-89468[U]
Sep. 12, 1983 [JP] Japan ........................... 58-142034[U]

[51] Int. Cl.⁴ ............................................. G05G 1/00
[52] U.S. Cl. ...................................... 74/503; 74/548;
74/529; 74/540; 74/543; 192/67 R
[58] Field of Search ................ 74/540, 541, 503, 543, 74/529, 504, 547, 548; 192/67 R, 95; 403/1, 336

[56] References Cited

U.S. PATENT DOCUMENTS

| | | | |
|---|---|---|---|
| 15,907 | 10/1856 | Talbot | 74/543 |
| 1,330,715 | 2/1920 | Mason et al. | 74/541 |
| 1,851,307 | 3/1932 | Hazelton | 74/548 |
| 1,908,423 | 5/1933 | Hjermstad | 74/547 |
| 2,044,492 | 6/1936 | Baldwin | 74/503 |
| 2,631,470 | 3/1953 | Sandberg | 74/503 |
| 2,666,339 | 1/1954 | Schwarz | 74/503 |
| 2,780,333 | 2/1957 | Reiser et al. | 74/548 X |
| 2,811,866 | 11/1957 | Buchanan | 74/503 |
| 2,829,538 | 4/1958 | Mueller | 74/548 |
| 2,865,664 | 12/1958 | Robb | 192/67 X |
| 2,899,841 | 8/1959 | Melloy | 74/548 |
| 2,937,535 | 5/1960 | Wezner | 74/548 X |
| 3,337,245 | 8/1967 | Prange | 192/67 X |
| 3,475,986 | 11/1969 | Schamel | 74/547 |
| 3,605,521 | 9/1971 | Glenn | 74/548 |

FOREIGN PATENT DOCUMENTS

| | | | |
|---|---|---|---|
| 1131103 | 6/1962 | Denmark . | |
| 2200 | 1/1904 | France . | |
| 636012 | 3/1928 | France | 74/543 |
| 1299623 | 6/1962 | France | 74/548 |
| 155960 | 4/1980 | Japan . | |
| 57-543 | 5/1981 | Japan . | |
| 279840 | 5/1928 | United Kingdom | 74/504 |
| 742635 | 12/1955 | United Kingdom . | |
| 661869 | 5/1979 | U.S.S.R. | 74/548 |

Primary Examiner—Richard E. Moore
Assistant Examiner—Rodney M. Lindsey
Attorney, Agent, or Firm—Finnegan, Henderson, Farabow, Garrett & Dunner

[57] ABSTRACT

A vehicle hand brake lever assembly for actuating the vehicle parking brake. The lever assembly includes an axially slidable plunger mounted on a support and having one end connected with a brake actuating member. The plunger and the support have a ratchet mechanism for holding the plunger at the brake applying position. The ratchet mechanism can be released by rotating the plunger about its longitudinal axis. A handle assembly is provided at the other end of the plunger and comprises a handle having a handle shaft. A sleeve fitted to a cylindrical guide member is secured to one of the sleeve and the handle shaft, and a lock member to the other. The lock member is axially slidably received in the guide member and provided with a cam profile for cooperation with a cam profile provided on the sleeve. The lock member is spring biased toward the sleeve so that the cam profiles are normally engaged with each other to thereby maintain the handle shaft at a predetermined relationship with respect to the plunger. The lock member further has axial projections and the guide member has an end wall formed with cutouts for receiving the axial projections on the lock member when the handle shaft is pulled axially against the biasing force to thereby connect the handle shaft with the plunger so that the plunger can be rotated about its longitudinal axis to release the ratchet mechanism on the plunger.

6 Claims, 17 Drawing Figures

STICK TYPE VEHICLE HAND BRAKE LEVER MEANS

BACKGROUND OF THE INVENTION

The present invention relates to stick type hand brake lever means for vehicles, and more particularly to safety means for such stick type hand brake lever means.

Conventionally, a stick type hand brake lever assembly includes a plunger mounted on an elongated guide for axial slidable movements and for rotation about its own axis. A brake actuating wire is attached directly or through a link to one end of the plunger and an operating handle is provided at the other end so that the hand brake is applied by gripping the operating handle and pulling axially the plunger along the guide. In order to have the plunger held at the pulled-out position, the plunger is provided with a locking mechanism which can be released by rotating the plunger about its axis. Usually, such locking mechanism is comprised of ratchet teeth formed on the plunger and a retaining pawl provided on the guide or any other stationary member.

In this type of hand brake lever assembly, problems have been experienced in that in the brake-applied position the handle may be rotated by being inadvertently touched by the driver or anyone else causing the plunger to rotate. This rotation of the plunger releases the plunger locking mechanism to thereby have the plunger returned to its retracted position simultaneously releasing the hand brake.

Hithertofore, various proposals have been made for avoiding such problems. For example, there has been proposed to make the operating handle freely rotatable in the pulled-out position when someone inadvertently touches the handle, so that the rotation of the handle does not cause any rotation of the plunger. In this solution, however, it is required that the operating handle be rotatable without any limitation in the rotating angle but it must be held against free rotation under its own weight or under an inertia force. Further, means must be provided for making it possible to release the plunger locking mechanism by putting the handle at a certain relationship with the plunger. However, none of prior proposals have been satisfactory in meeting the above requirements.

SUMMARY OF THE INVENTION

It is therefore an object of the present invention to provide vehicle hand brake lever means of a stick type in which the operating handle is rotatable in the pulled-out position of the plunger without any limitation of rotating angle while free rotation of the handle under its own weight or under an inertia force can effectively be prevented.

Another object of the present invention is to provide vehicle hand brake lever means which has an operating handle rotatable with respect to the plunger and in which the plunger can be locked and unlocked without fail in the pulled-out position by means of the operating handle.

According to the present invention, the above and other objects can be accomplished by vehicle hand brake lever means comprising a plunger having a longitudinal axis and mounted for axial slidable movement and for rotation about the longitudinal axis, said plunger being connected at one end with a member for actuating vehicle hand brake means, handle means provided at the other end of the plunger and having a handle shaft, a guide member secured to one of said plunger and said handle shaft, the other of said plunger and said handle shaft being inserted into said guide member, said plunger and said handle shaft being provided with cam means for holding said handle shaft means at a predetermined relationship with respect to said plunger, resilient means for biasing said handle shaft toward said plunger so that said handle shaft means is normally held at said predetermined relationship with respect to the plunger, said guide member being provided with locking means for locking said handle shaft to said plunger so that the handle shaft and the plunger are rotated together about the axis of said plunger when the handle shaft is moved axially with respect to said plunger against biasing force of said resilient means, said cam means having an axial stroke which is smaller than an axial stroke of said handle shaft required for making the locking means to engage.

According to a preferable aspect of the present invention, said one of the plunger and the handle shaft has a sleeve secured thereto and fitted to the guide member, said other of the plunger and the handle shaft having a lock member which is slidably received by the guide member and having a cam profile, said sleeve having a cam profile for cooperation with said cam profile on said lock member to provide said cam means. In a further aspect of the present invention, the lock member is provided with means for engaging cooperating means in said guide member when the handle shaft is moved axially against the biasing force of the resilient means to provide said locking means. In a more specific feature, the locking means is comprised for cutout means formed in the guide member and projection means provided on the cam member for engagement with the cutout means in the guide member when the handle shaft is moved axially with respect to the plunger.

According to the features of the present invention, the handle shaft is normally maintained at a predetermined relationship with respect to the plunger by the cam means but rotatable relative to the plunger when someone inadvertently touches the handle. Whenever, it becomes necessary to have the plunger rotated about its own axis in order for releasing the plunger to return to the retracted position, the handle shaft can be connected with the plunger by the locking means by simply moving the handle shaft axially. Since the handle shaft is held by the cam means, it is possible to prevent free rotation of the handle under its own weight or under an inertia force.

BRIEF DESCRIPTION OF THE DRAWINGS

The above and other objects and features of the present invention will become apparent from the following descriptions of preferred embodiments taking reference to the accompanying drawings, in which.

DESCRIPTION OF THE PREFERRED EMBODIMENT

Figure 1:
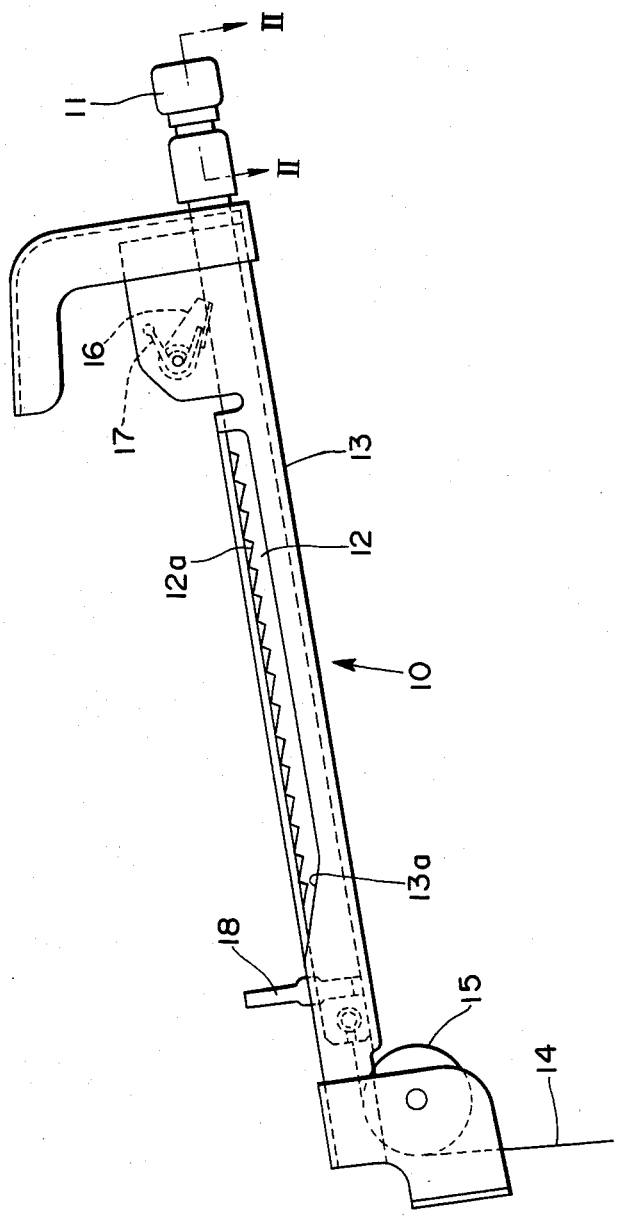
FIG. 1 is a side view of a stick type hand brake lever assembly in accordance with one embodiment of the present invention.

Referring now to the drawings, particularly to FIG. 1, there is shown a vehicle hand brake lever assembly 10 including an operating handle 11 and a plunger 12. A stationary support 13 is provided for supporting the plunger 12 for axial slidable movement and for rotation about the longitudinal axis of the plunger 12. At one end, the support 13 has a pulley 15 which is rotatably mounted on the support 13. A brake actuating wire 14 is passed around the roller 15 and connected at one end to one end of the plunger 12. Although not shown in FIG. 1, the other end of the wire 14 is connected with a brake actuating member so that by moving the plunger 12 axially toward right as seen in FIG. 1 the hand brake is applied. In order to hold the plunger 12 at the brake applied position, there is provided a ratchet type locking mechanism which is comprised of ratchet teeth 12a formed on the plunger 12 arranged in a series longitudinally of the plunger 12 and a pawl 16 pivotably mounted on the support 13. The pawl 16 is biased by a spring 17 so that it is engaged with the ratchet teeth 12a. Thus, when the plunger 12 is pulled rightward, the engagement between the ratchet teeth 12a and the pawl 16 holds the plunger 12 in the pulled-out position against a returning effort which is applied to the plunger 12 by the brake mechanism through the wire 14. Since the ratchet teeth 12a are formed only partially in the circumference of the plunger 12, the engagement between the ratchet teeth 12a and the pawl 16 can be released by rotating the plunger 12 about its longitudinal axis. The plunger 12 has a pin 18 radially projecting from the plunger 12 and the support 13 is formed with a cam profile 13a for cooperation with the pin 18. As the plunger 12 is returned to the brake release position under the returning force which is applied through the wire 14, the pin 18 on the plunger 12 is engaged with the cam surface 13a so that the plunger 12 is rotated about its axis to a position wherein the pawl 16 can engage the ratchet teeth 12a when the plunger 12 is pulled out.

Referring now to FIGS. 2 through 5, it will be noted that the plunger 12 has at its outer end a sleeve 19 and a cylindrical guide member 20 fitted to the outer surface of the sleeve 19. The sleeve 19 and the guide member 20 are secured to the plunger 12 by means of a radially extending retaining pin 21. The handle 11 is comprised of a grip portion 11a made of a plastic material and embedded with a metal core 11b. The metal core 11b has secured thereto a handle shaft 11c extending perpendicularly from the metal core 11b. The handle shaft 11c extends into the guide member 20 through an end wall 20a in the outer end of the guide member 20. A lock member 22 is provided in the guide member 20 and secured to the free end of the handle shaft 11c by means of a radially extending retaining pin 24. Between the lock member 22 and the end wall 20a of the guide member 20, there is a compression spring 23 which urges the handle shaft 11c and the lock member 22 toward the plunger 12 and the sleeve 19.

The lock member 22 has a cam profile 22a at the end opposite to the handle 11 and the sleeve 19 has a corresponding cam profile 19a at the end facing to the lock member 22. Thus, in a position wherein the lock member 22 is moved under the influence of the spring 23 into engagement with the sleeve 19, the handle shaft 11c and the lock member 22 are held at a predetermined relationship with respect to the plunger 12 and the parts secured thereto. As clearly shown in FIG. 4, the lock member 22 is formed with axial projections 22b extending from an end surface 22c axially toward the end wall 20a of the guide member 20. In the end wall 20a of the guide member 20, there are formed a pair of cut-outs 20b at portions corresponding to the axial projections 22b on the lock member 22 when the lock member 22 is in the position as determined by the engagement between the cam profiles 19a and 22a. Thus, it will be understood that when the handle 11 is pulled, the lock member 22 is axially moved against the action of the spring 23 with respect to the guide member 20 and the projections 22b on the lock member 22 are engaged with the cutouts 20b in the end wall 20a of the guide member 20. Therefore, it becomes possible to rotate the plunger 12 by actuating the handle 11. The spring 23 is of such a rate that, when the lock member 22 is engaged with the sleeve 19 under the action of the spring 23, the handle 11 is held due to the cam action between the cam profiles 19a and 22a against movement under its own weight or under vibrations but the handle 11 can be rotated overcoming the cam action when it is inadvertently touched by the driver or by anyone else. It should of course be noted that the spring 23 should not be so strong that it produces a cam action which may cause a rotation of the plunger 12 when the handle 11 is turned by being inadvertently touched.

Figure 2:
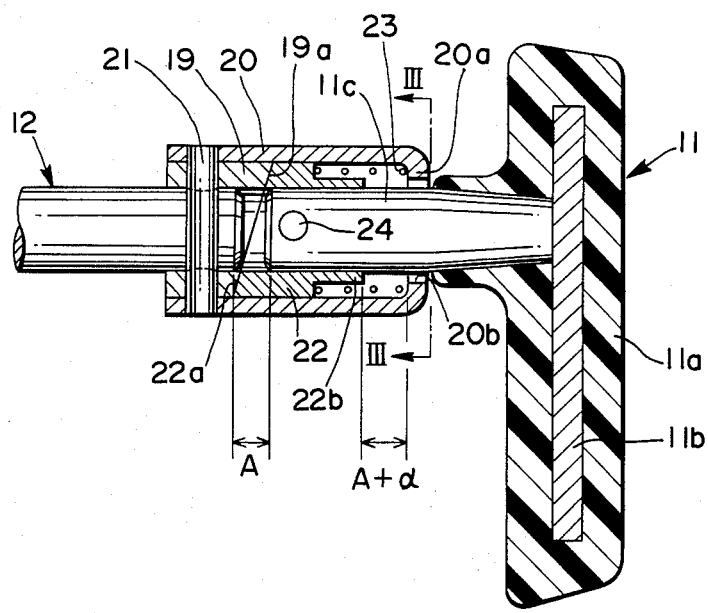
FIG. 2 is a fragmentary sectional view taken substantially along the line II—II in FIG. 1.
Figure 3:
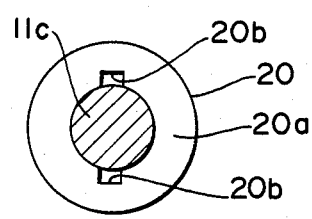
FIG. 3 is a sectional view taken along the line III—III in FIG. 2.
Figure 4:
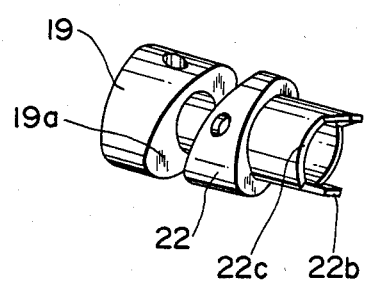
FIG. 4 is a perspective view of the cam mechanism adopted in the embodiment shown in FIGS. 1 through 3.
Figure 5:
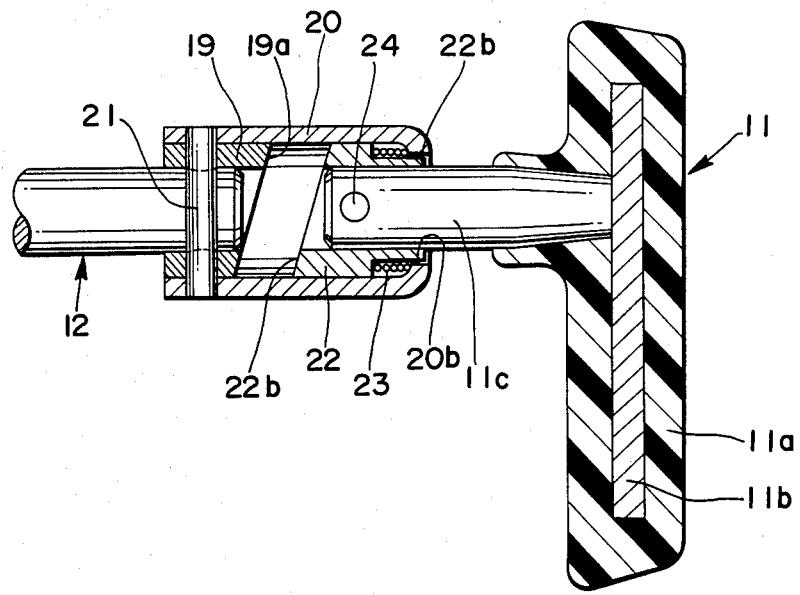
FIG. 5 is a fragmentary sectional view similar to FIG. 2 but showing the parts in the brake applied position.

In operation, when an operator pulls the handle 11 rightward as seen in FIG. 2 to apply the hand brake, the lock member 22 on the handle shaft 11c is also moved rightward until the axial projections 22b are engaged with the cutouts 20b and the end surface 22c on the lock member 22 is abutted to the end wall 20a of the guide member 20. Thus, the force on the handle 11 is transmitted through the guide member 20 to the plunger 12 to cause rightward movement of the plunger 12. Therefore, the hand brake is applied. The pawl 16 engages one of the ratchet teeth 12a to maintain the plunger 12 at the pulled-out position. When the handle 11 is released, the handle 11 and the handle shaft 11c are returned to the positions shown in FIG. 2 under the action of the spring 23 together with the lock member 22. In this position, even when the handle 11 is rotated by being inadvertently touched, the plunger 12 is not rotated because the handle 11 and the parts secured thereto are rotatable overcoming the cam action between the cam profiles 19a and 22a. It should of course be noted that the cam profiles 19a and 22a has a cam lift which is not large enough to cause engagement of the lock member 22 and the guide member 20 when the handle 11 is inadvertently rotated.

When it is intended to release the hand brake, the handle 11 is pulled until the projections 22b on the lock member 22 are engaged with the cutouts 20b in the end wall 20a of the guide member 20 and then turned about the axis of the handle shaft 11c. Then, the rotation of the handle shaft 11c is transmitted through the guide member 20 to the plunger 12 to cause a rotation of the plunger 12. This will cause the pawl 16 to be disengaged from the ratched teeth 12a and the plunger 12 can be returned to the brake released position. In the brake release position, the plunger 12 restores its initial position wherein the pawl 16 is engageable with the ratchet teeth 12a because the pin 18 engages the cam profile 13a.

Figure 6:
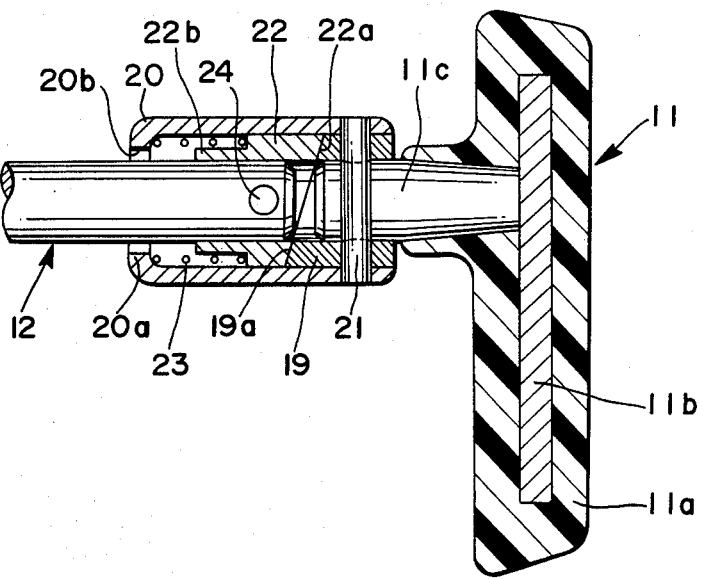
FIG. 6 is a fragmentary sectional view similar to FIG. 2 but showing another embodiment.
Figure 7:
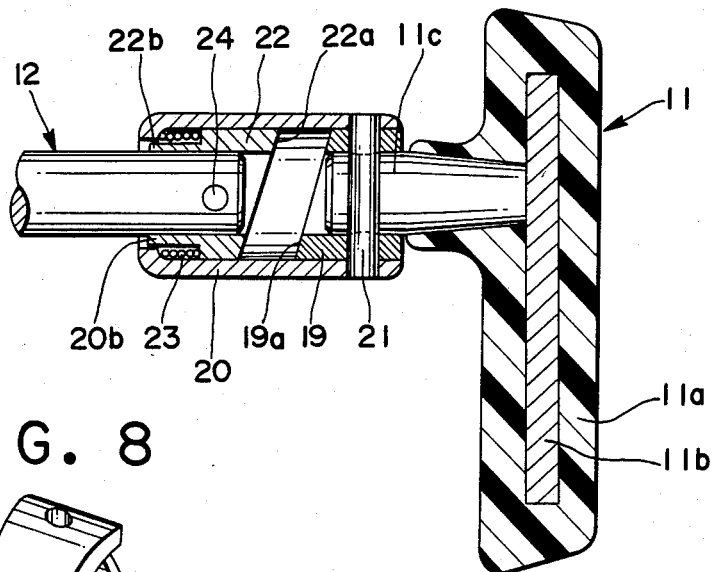
FIG. 7 is a sectional view showing the embodiment in FIG. 6 in the brake applied position.

Referring to FIGS. 6 and 7, there is shown another embodiment of the present invention. This embodiment is different from the previous embodiment in that the guide member 20 and the sleeve 19 are secured not to the plunger 12 but to the handle shaft 11c and the lock member 22 is secured to the plunger 12. In this embodiment, the handle assembly is assembled by putting the guide member 20 on the plunger 12 and then locating the spring 23 and the lock member 22 in the guide member 20 thereafter inserting the retaining pin 24 through the lock member 22 and the plunger 12 with the guide member 20 displaced leftwardly as seen in FIG. 6. The guide member 20 functions to retain the pin 24 in position. Further, the work for installing the lock member 22 on the plunger 12 can be easily done because it becomes possible to ensure the alignment of radial holes for receiving the retaining pin 24 in the lock member 22 and the plunger 12.

Figure 8:
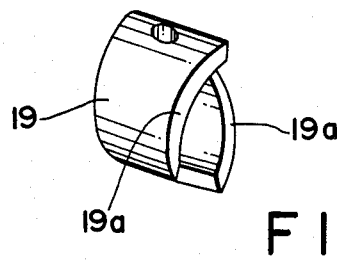
FIG. 8 is a perspective view showing a modified configuration of the cam member.

In FIG. 8, there is shown another example of cam profiles formed on the sleeve 19 and the lock member 22. The drawing shows only the cam profiles which is to be formed in the sleeve 19 but it should be noted that the cam profile on the lock member 22 is complementary to this cam profile. In the example in FIG. 8, the sleeve 19 is formed with a pair of cam slopes 19a which extend respectively in angular extents of 180°. With this form of cam profile, the handle 11 can take two stable positions.

Figure 9:
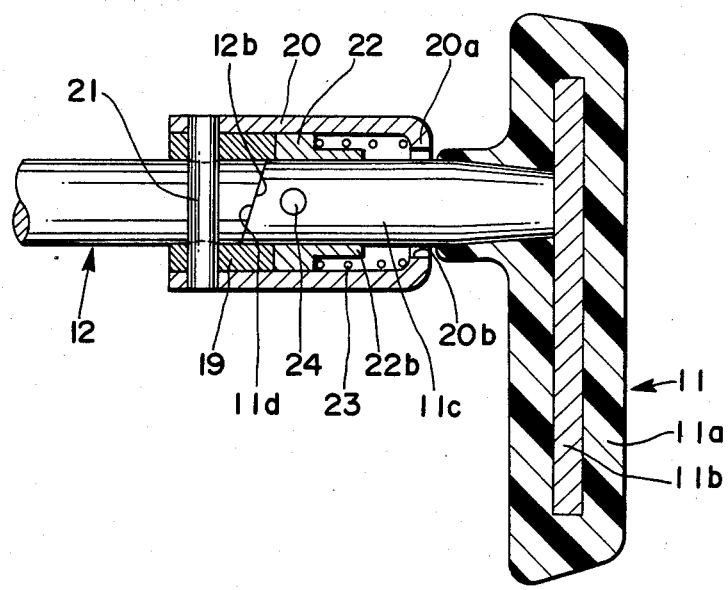
FIG. 9 is a sectional view showing a further embodiment of the present invention.

Referring to FIG. 9, there is shown a further embodiment of the present invention. This embodiment is different from the previous embodiment in that the plunger 12 and the handle shaft 11c are formed at the confronting ends with cam profiles 12b and 11d, respectively.

In the previous embodiments, the arrangements are such that the lock member 22 is connected with the guide member 20 by means of the projections 22b on the lock member 22 and the cutouts 20b in the end wall 20a of the guide member 20. However, it should be noted that the rotation of the handle shaft 11c may be transmitted to the guide member 20 through a frictional engagement between the end surface of the lock member 22 and the end wall 20a of the guide member 20.

Referring to FIGS. 10 through 17, there is shown a further embodiment of the present invention. As in the previous embodiments, the handle 11 in this embodiment includes a grip portion 11a made of a plastic material and embedded with a metal core 11b which has a handle shaft 11c secured thereto. The handle shaft 11c extends perpendicularly to the grip portion 11a and projects therefrom at a portion offset toward one end of the grip portion 11a. A sleeve 19 is secured to the outer end of the handle shaft 11c and a substantially cylindrical guide member 20 is fitted to the outer periphery of the sleeve 19. In order to secure the sleeve 19 and the guide member 20 to the handle shaft 11c, a pin 21 is installed through these parts.

Figure 10:
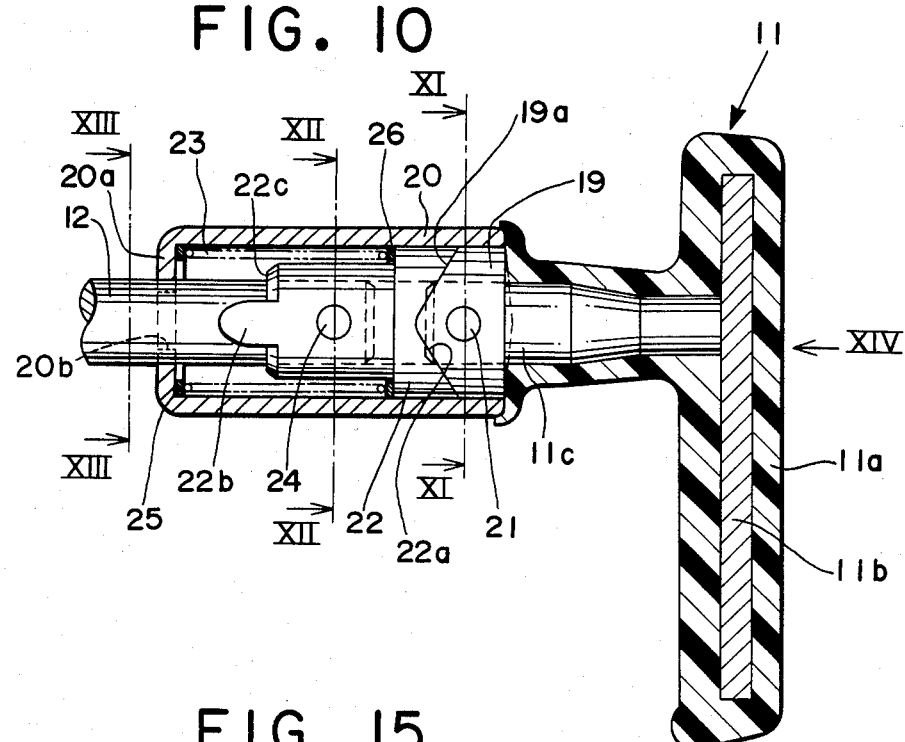
FIG. 10 is a sectional view showing still further embodiment of the present invention.
Figure 15:
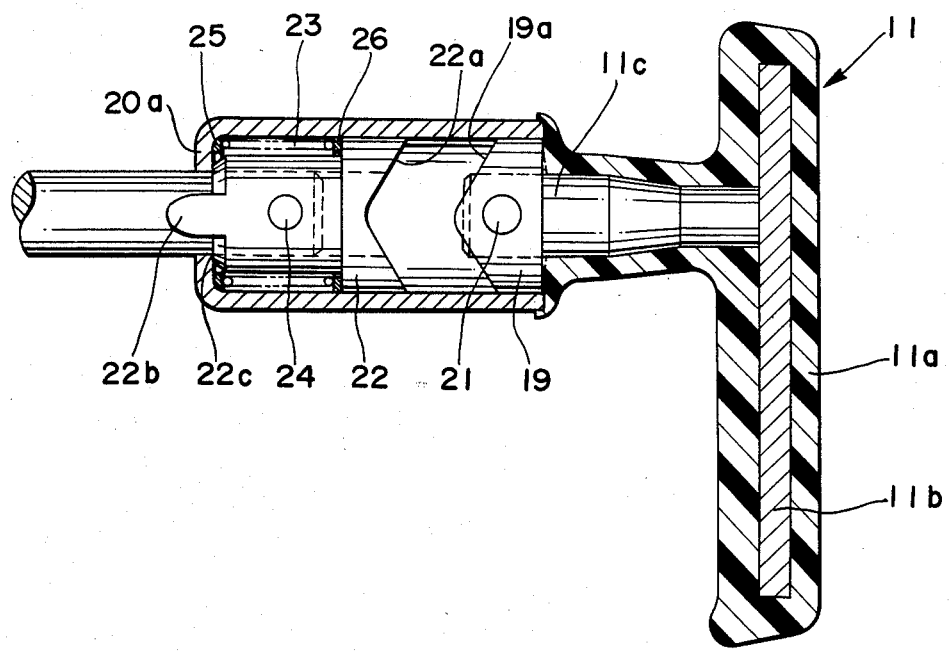
FIG. 15 is a sectional view showing the parts in the brake applied position in the embodiment shown in FIGS. 10 through 14.
Figure 11:
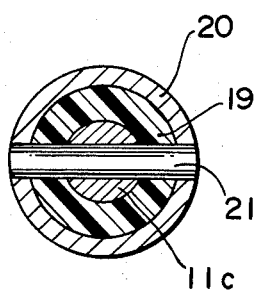
FIG. 11 is a sectional view taken substantially along the line XI—XI in FIG. 10.
Figure 12:
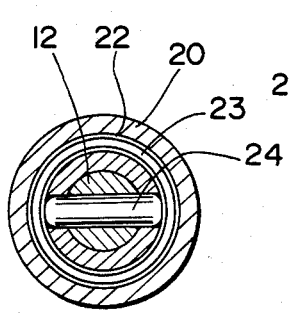
FIG. 12 is a sectional view taken substantially along the line XII—XII in FIG. 10.

The plunger 12 is inserted through an end wall 20a into the guide member 20 and axially slidable and rotatable with respect to the guide member 20. In the guide member 20, there is a cylindrical lock member 22 which is axially slidable with respect to the guide member 20. The lock member 22 is secured to the plunger 12 by means of a retaining pin 24. Between the lock member 22 and the end wall 20a of the guide member 20, there is disposed a compression spring 23 which is engaged with the end wall 20a through a low friction washer 25 and with the lock member 22 through a low friction washer 26. The spring 23 functions to bias the lock member 22 toward the sleeve 19. As in the embodiment in FIGS. 2 through 5, the sleeve 19 in this embodiment is formed at an end adjacent to the lock member 22 with a cam profile 19a. Further, the lock member 22 has a cam profile 22a for cooperation with the cam profile 19a on the sleeve 19. The lock member 22 is formed at an end adjacent to the end wall 20a of the guide member 20 with an abutting end surface 22c and a pair of axial projections 22b extending axially from the end surface 22c. The end wall 20a of the guide member 20 is formed with cutouts 20b for engagement with the projections on the lock member 22 when the handle 11 is pulled rightward as seen in FIG. 10 so that the guide member 20 secured to the handle shaft 11c is rotated with the lock member 22 secured to the plunger 12. Further, when the handle 11 is pulled rightward so as to move the guide member 20 against the action of the spring 23, the end wall 20a of the guide member 20 is brought into abutting engagement with the end surface 22c of the lock member 22 as shown in FIG. 15. Therefore, a further movement of the handle 11 causes a corresponding axial movement of the plunger 12.

Figure 13:
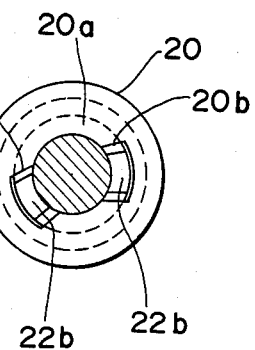
FIG. 13 is a sectional view taken substantially along the line XIII—XIII in FIG. 10.
Figure 14:
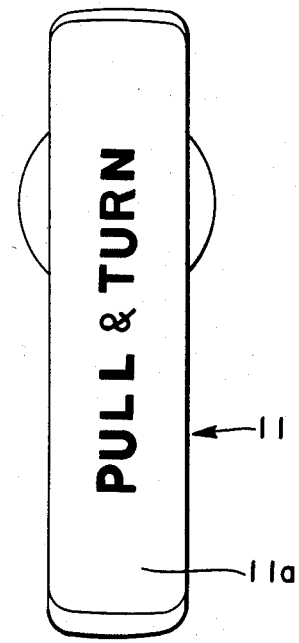
FIG. 14 is a view as seen along the arrow XIV in FIG. 10.
Figure 16:
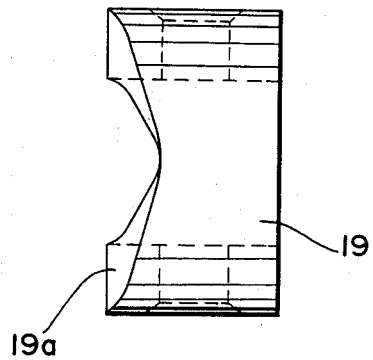
FIGS. 16 and 17 are views of another embodiment of a sleeve and lock member.
Figure 17:
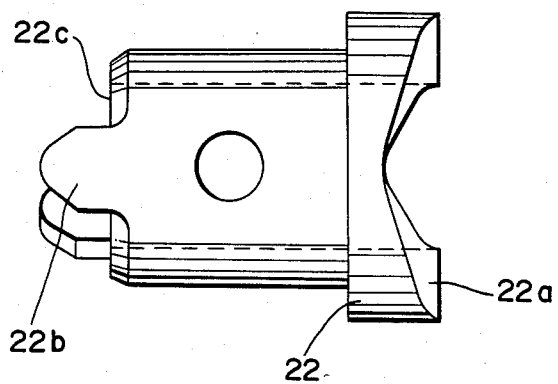

The configurations of the cam profiles 19a and 22a are of W-shape in a developed form and each of the cam profiles has two cam lobes. The cam profile 19a on the sleeve 19 is shown in FIG. 16 and the cam profile 22a on the lock member 22 is shown in FIG. 17. As shown in FIGS. 16 and 17, the cam profiles 19a and 22a are such that their cam surfaces are perpendicular to the axis of the plunger 12. Thus, the cam profile 22a on the lock member 22 normally maintained in engagement with the cam profile 19a on the sleeve 19 under the action of the spring 23 functions to maintain the handle 11 at either of two different positions, one being the position rotated by an angle 180° from the other position. The cam lift of the cam profiles 19a and 22a is smaller than the stroke required for bringing the lock member 22 into engagement with the guide member 20. The projections 22b on the lock member 22 are located nonsymmetrically with respect to the axis of the plunger 12 as shown in FIG. 13 so that the projections 22b can be brought into engagement with the cutouts 20b in the guide member 20 when the handle 11 is pulled with the lock member 20 located in one of the aforementioned two different positions but cannot be brought into such engagement from the other of the positions. The functions of this embodiment are substantially the same as in the previous embodiment.

The invention has thus been shown and described with reference to specific embodiments, however, it should be noted that the invention is in no way limited to the details of the illustrated structures but changes and modifications may be made without departing from the appended claims.

What is claimed is:

1. A vehicle hand brake comprising:
   braking means for applying braking force in response to linear movement;
   a longitudinal rod being rotationally and slidably movable about the axis thereof and having a first end attached to said braking means and a second end, said rod also having an outer peripheral surface containing a series of ratchet teeth;
   support means for receiving said rod and having pawl means for engaging said ratchet teeth and rigidly positioning said rod relative to said support means;
   a locking member affixed on said second end and including projection means and a first cam surface having a predetermined cam stroke defined with respect to movement along the axis of said rod;
   guide means coaxially positioned in relation to said rod for engagement with said locking member and including a sleeve and a housing, said sleeve having a second cam surface complementary with said first cam surface to restrict rotational movement of said first cam surface relative to said second cam surface in response to axial movement less than said cam stroke, said housing having an aperture extending about said rod and including at least one indentation for receiving said projection means by slidably moving said housing a predetermined distance relative to said locking member;
   lever means attached to said housing for positioning said projection means into engagement with said at least one indentation to move said rod about and along said axis and to allow disengagement of said pawl means from said ratchet teeth; and
   resilient means affixed between said guide means and said locking member for biasing said lever means toward said rod to position said first and second cam surfaces normally in abutment, wherein said cam stroke required to realign said first and second cam surfaces is less than said predetermined distance of axial movement necessary for engaging said projection means of said locking member with said at least one indentation of said housing, thereby preventing disengagement of said pawl means from said ratchet teeth through independent rotation of said lever means when the axial movement of said lever means is less than said predetermined distance.

2. The vehicle hand brake defined in claim 1, wherein said first and second cam surfaces are shaped to enable said lever means to be held in two positions relative to said axis of rotation of said rod, and wherein said projection means is slidably positioned into engagement with said at least one indentation from only one of said positions.

3. The vehicle hand brake as defined in claim 2, wherein said first position is about 180° from said second position relative to said axis of rotation of said rod, and wherein two indentations are asymmetrically positioned on said guide means relative to said axis, and wherein said projection means include two projections aligned to engage said two indentations.

4. The vehicle hand brake as defined in claim 1, wherein said first position is about 180° from said second position relative to said axis of said rod, wherein said two indentations are asymmetrically positioned on said guide means relative to said axis, and wherein said projection means includes two projections aligned to engage said two indentations.

5. A vehicle hand brake comprising:
   braking means for applying braking force in response to linear movement;
   a longitudinal rod being rotationally and slidably movable about the axis thereof and having a first end attached to said braking means and a second end, said rod also having an outer peripheral surface containing a series of ratchet teeth;
   support means for receiving said rod and having pawl means for engaging said ratchet teeth and rigidly positioning said rod relative to said support means;
   a sleeve affixed on said second end and including a first cam surface;
   guide means coaxially mounted on said second end and substantially enveloping said sleeve, said guide means including an aperture and at least one indentation coaxially positioned relative to said second end;
   a locking member slidably mounted within said guide means and including a second cam surface complementary with said first cam surface and having a predetermined cam stroke defined with respect to movement along the axis of said rod to restrict rotational movement of said second cam surface relative to said first cam surface in response to axial movement less than said cam stroke, said locking member also including projection means extending therefrom;
   lever means attached to said locking member for slidably positioning said projection means a predetermined distance into engagement with said at least one indentation; and
   resilient means affixed between said guide means and said locking member for biasing said lever means toward said rod to position said first and second cam surfaces normally in abutment, wherein said cam stroke required to realign said first and second cam surfaces is less than said predetermined distance of axial movement necessary for engaging said projection means of said locking member with said at least one indentation of said guide means, thereby preventing disengagement of said pawl means from said ratchet teeth through independent rotation of said lever means when the axial movement of said lever means is less than said predetermined distance.

6. The vehicle hand brake as defined in claim 5, wherein said first and second cam surfaces are shaped to enable said lever means to be held in two positions relative to the axis of rotation of said rod, and wherein said projection means are slidably positioned into engagement with said at least one indentation from only one of said positions.

* * * * *